US008382308B2

(12) United States Patent
Hecht et al.

(10) Patent No.: US 8,382,308 B2

(45) Date of Patent: Feb. 26, 2013

(54) POWER TOOL HAVING A WORK FIELD LIGHTING SYSTEM

(75) Inventors: Joachim Hecht, Magstadt (DE); Jens Brennenstuhl, Albershausen (DE); Heiko Roehm, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/809,928

(22) PCT Filed: Nov. 11, 2008

(86) PCT No.: PCT/EP2008/065300

§ 371 (c)(1), (2), (4) Date: Jun. 21, 2010

(87) PCT Pub. No.: WO2009/080404

PCT Pub. Date: Jul. 2, 2009

(65) Prior Publication Data

US 2010/0277897 A1 Nov. 4, 2010

(30) Foreign Application Priority Data

Dec. 20, 2007 (DE) ......................... 10 2007 061 741

(51) Int. Cl.
*F21V 33/00* (2006.01)
*B23G 1/00* (2006.01)

(52) U.S. Cl. .......... 362/109; 362/119; 362/120; 362/89; 362/578; 362/577; 408/16

(58) Field of Classification Search .................. 362/119, 362/89, 81, 109, 120, 577, 578; 408/16
See application file for complete search history.

(56) References Cited

U.S. PATENT DOCUMENTS

| | | | | |
|---|---|---|---|---|
| 367,668 | A * | 8/1887 | Schmiedl | 33/575 |
| 2,257,127 | A * | 9/1941 | Roper et al. | 362/470 |
| 2,310,166 | A * | 2/1943 | Way | 362/119 |
| 5,169,225 | A * | 12/1992 | Palm | 362/118 |
| 6,590,220 | B1 * | 7/2003 | Kalley et al. | 250/504 H |
| 6,616,295 | B2 * | 9/2003 | Sako et al. | 362/119 |
| 7,404,696 | B2 * | 7/2008 | Campbell | 408/16 |
| 8,016,048 | B2 * | 9/2011 | Ueda et al. | 173/176 |
| 2006/0134576 | A1 * | 6/2006 | West | 433/29 |
| 2006/0262519 | A1 * | 11/2006 | Hirschburger et al. | 362/119 |
| 2007/0256914 | A1 * | 11/2007 | Lohr et al. | 200/5 A |
| 2010/0296271 | A1 * | 11/2010 | Chien | 362/119 |

FOREIGN PATENT DOCUMENTS

| | | | |
|---|---|---|---|
| DE | 9107667 | U1 | 9/1991 |
| DE | 29719020 | U1 | 12/1997 |
| DE | 102004051913 | A1 | 2/2006 |

* cited by examiner

*Primary Examiner* — Jong-Suk (James) Lee
*Assistant Examiner* — Tsion Tumebo
(74) *Attorney, Agent, or Firm* — Kenyon & Kenyon LLP

(57) ABSTRACT

The invention relates to a machine tool having working field illumination disposed in a housing, having an illumination mechanism and a transparent element which allows the light from the illumination mechanism to be led out toward the working field. A light beam can be deflected between the illumination mechanism and the transparent element. According to the invention, the transparent element forms a region of the housing.

21 Claims, 4 Drawing Sheets

POWER TOOL HAVING A WORK FIELD LIGHTING SYSTEM

CROSS-REFERENCE TO RELATED APPLICATION

This application is a 35 USC 371 application of PCT/EP2008/065300 filed on Nov. 11, 2008.

BACKGROUND OF THE INVENTION

1. Field of the Invention

The invention relates to a power tool having a work field lighting system.

2. Description of the Prior Art

Handheld electric power tools, such as plug-in and/or cordless screwdrivers, rotary drills, impact screwdrivers or impact power drills have a gear, a motor, a switch with a switch actuation element accessible on the housing, and a motor housing. It is known to equip such tools with a work field lighting system, so that work can be done even under unfavorable light conditions.

From German Utility Model 297 19 020 U1, an electric power tool is known in which a lighting means is disposed underneath the gear, above the switch actuation element. Typically, the lighting means must be disposed at an angle to the tool holder axis, so that it can also illuminate the end of short tool bits, such as short screwdriver bits. Although the structural length of the lighting unit is advantageously short in the tool bit axis direction, nevertheless an adequate structural height is necessary to make it possible to dispose the lighting means at a sufficiently large angle. The switch actuation element therefore has a greater spacing from the gearbox, and the lighting means can easily be damaged. With conventional cabling, the cables must typically be extended around a movable switch for changing the direction of rotation, and this requires additional space.

Alternatively, the lighting means can be disposed inside the electric power tool parallel to the tool holder axis, and for directional correction of the beam of light a lens is disposed in front of it, to make it possible to deflect the beam of light to the end of short tool inserts as well. Although the structural height is now low, and the lighting means is disposed inside the housing and protected against damage, nevertheless, the structural length is relatively long because of the serial disposition of the lens and lighting means. German Patent Disclosure DE 84 24642 discloses an electric power tool in which an optical waveguide is disposed between a lens and the lighting means, and with the optical waveguide, the light can be conducted from the lighting means, disposed in the handle, to a lens attached to the housing.

Since typically the switch for changing the direction of rotation and a screw dome also have to be disposed between the switch actuation element and the gearbox, the result is a compromise between a functioning work field lighting system and an optimal location of the handle or switch actuation element.

ADVANTAGES AND SUMMARY OF THE INVENTION

The invention is based on a power tool having a work field lighting system disposed in a housing, the work field lighting system including a lighting mechanism and a transparent element from which light from the lighting mechanism can be output to the work field, and a beam of light can be deflected between the lighting mechanism and the transparent element.

It is proposed that the transparent element forms one region of the housing.

Advantageously, the lighting mechanism, or its primary beam of light, can be disposed at any angle to the tool holder axis. Because the transparent element is integrated with the housing, and the lighting mechanism can be disposed separately from it, the structural height or length is not necessarily adversely affected. The housing itself can be embodied in one piece or in multiple parts. The disposition of the lighting mechanism in relation to the transparent element can be selected independently of a necessary beam of light direction for illuminating the work field after the beam leaves the transparent element. This allows great freedom of design. The structural length of the lighting unit comprising the lighting means and the transparent element is slight. The structural height can be designed arbitrarily. Advantageously, the result is great flexibility in disposing the lighting mechanism in relation to the tool holder.

Because the transparent element forms one region of the housing, it penetrates the housing shell. Its light entry face is located inside the housing, while its light exit face points outward relative to the housing. A front-mounted lens for focusing the light of the lighting mechanism can be dispensed with. Instead, a focusing function can be integrated with the transparent element.

Preferably, a reflector face inside the housing can be disposed outside the transparent element in such a way that the light can be deflected via the reflector face into the light entry face of the transparent element. The reflector face can additionally focus the light aimed into the transparent element. An angle of the projected light for illuminating even short tool bit ends can easily be adjusted by the inclination of the reflector face.

In a favorable refinement, the reflector face can be a component of the transparent element. This makes for a very compact structure. The reflector face can be metallized, or it can be disposed at an angle to the lighting mechanism at which the light projected by the lighting mechanism and striking the reflector face can be totally reflected.

Propagation of the light between the lighting mechanism and the transparent element can preferably be done without an optical waveguide. The light between the lighting mechanism and the transparent element propagates in an air segment.

The lighting mechanism can advantageously be spaced apart from the transparent element. Thus the lighting mechanism can for instance be disposed on the gearbox near the tool holder. It is also possible for the work field lighting system to be disposed in the housing region located underneath the handle, for instance above a rechargeable battery pack that serves to supply power to the motor of the power tool. The reflector face can be disposed relative to the lighting mechanism and the transparent element in a spatially suitable way for accomplishing the deflection of the light from the lighting mechanism to the transparent element.

Alternatively, the lighting mechanism can engage a recess in the transparent element. The transparent element here can be preferably embodied as a prism into which the lighting mechanism is inserted. In that case, the reflector face can be a mirror-coated surface of the prism.

The reflector face can preferably be metal-coated, for deflecting the light. This is possible both for reflector faces that are separate from the transparent element and reflector faces embodied in the transparent element.

The reflector face can be disposed such that it makes a total reflection of the light possible and deflects the light in this way and conducts it to the light exit face of the transparent element. This is especially expedient when the reflector face is a component of the transparent element.

In a favorable refinement, the reflector face can be curved, for instance for attaining a light-focusing effect.

In an advantageous feature, the transparent element can adjoin a switch actuation element. As a result, the work field lighting system can be disposed in an especially space-saving way even for short tool inserts.

The lighting mechanism can favorably be activated when the switch actuation element is pressed, before a motor can be switched on by the switch actuation element. The work field lighting system can then already be active and illuminate the work field before the motor begins to rotate. This makes more-precise work and positioning of the power tool possible.

BRIEF DESCRIPTION OF THE DRAWINGS

Further advantages will become apparent from the ensuing description of the drawings in conjunction with the drawings, in which.

Shown are.

DESCRIPTION OF THE PREFERRED EMBODIMENTS

Figure 1:
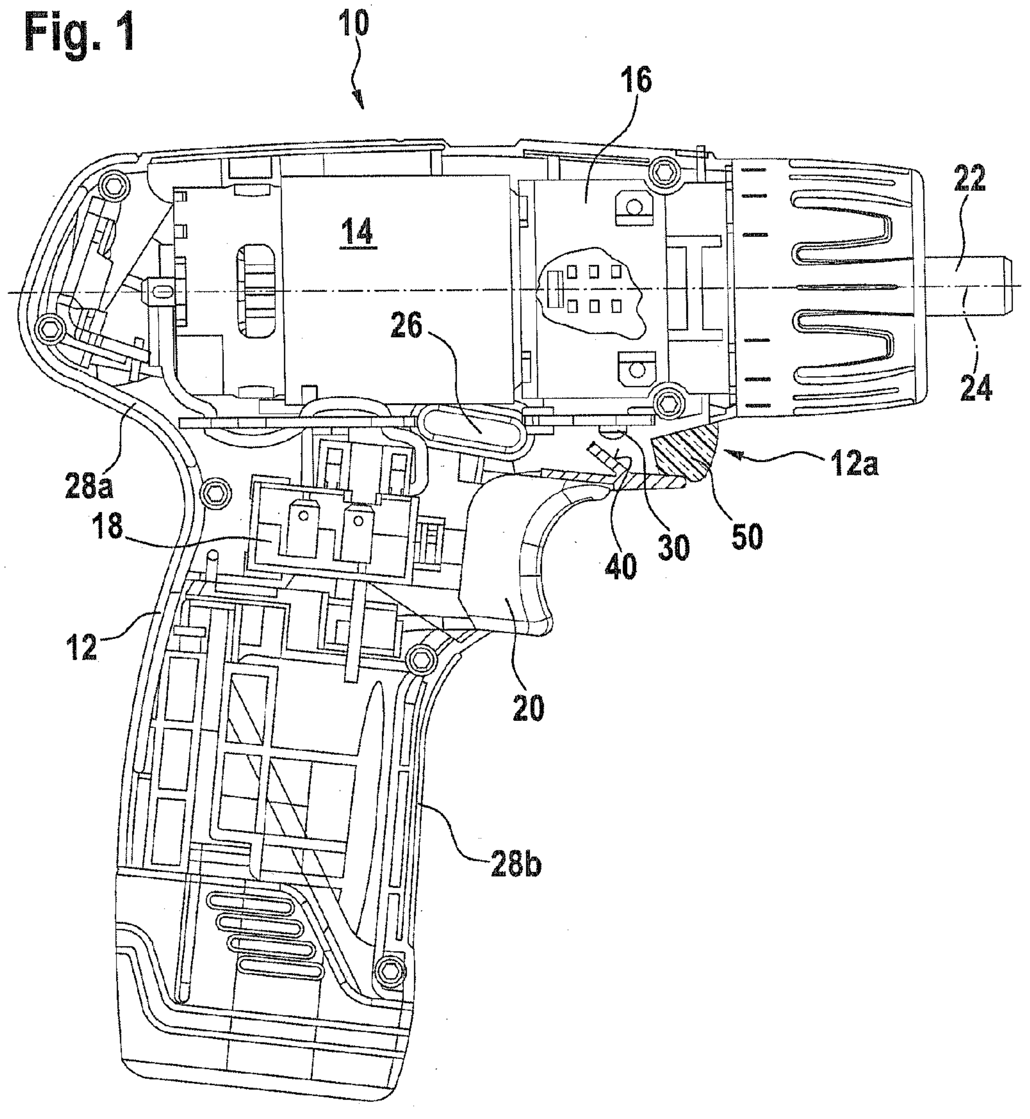
FIG. 1 shows a section through a first preferred embodiment of a cordless electric power tool having a first preferred work field lighting system.

In the drawings, identical or identically functioning elements are identified by the same reference numerals.

Figure 2:
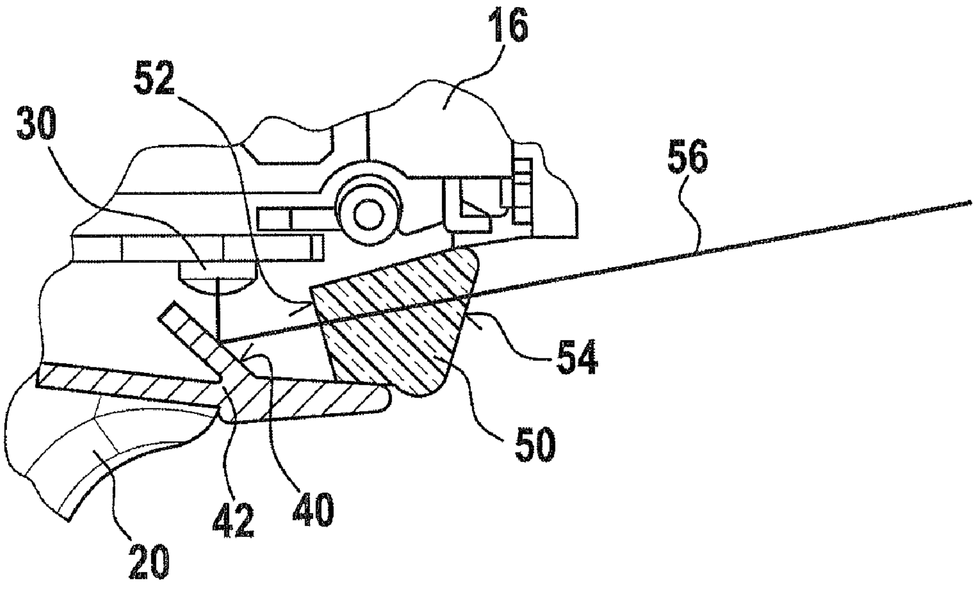
FIG. 2 shows a detail of the first preferred work field lighting system in FIG. 1.

For explanation of the invention, FIGS. 1 and 2 show a section through a power tool 10 in a first preferred embodiment. FIG. 2 shows a detail of that embodiment.

The power tool 10, embodied for instance as a cordless electric power tool, having a housing identified overall by reference numeral 12 includes a motor 14 in a motor housing 28*a*, with a gear 16, which is connected in the direction of a tool holder axis 24 and is disposed in a gearbox not identified by reference numeral, and adjoining it, a tool holder 22 for a tool insert, not shown. A switch 26 for changing the direction of rotation is disposed underneath the motor 14 and adjacent to it. The tool insert can be driven in rotary and/or percussive fashion. Underneath the motor 14 is a switch 18 for switching the motor 14 on and off; it can be actuated by a user of the power tool 10 via a switch actuation element 20. A handle part 28*b*, in which a battery pack, not identified by reference numeral, is inserted in the lower region, is adjacent to and beneath the switch actuation element 20.

The power tool 10 has a work field lighting system, which is disposed in the housing 12 and forms a housing region 12*a*; the work field lighting system includes a lighting means 30 and a transparent element 50. From the transparent element 50, light from the lighting means 30 can be fed to the work field in front of the tool holder 22, and a beam of light 56 can be deflected between the lighting means 30 and the transparent element 50 at a reflector face 40. Propagation of the light between the lighting means 30 and the transparent element 50 can be effected by means of an air segment, in particular without an optical waveguide.

The transparent element 50 forms one region 12*a* of the housing 12; that is, it penetrates the housing shell and protrudes with its light entry face 52 into the interior of the housing 12 and with its light exit face 54 it protrudes outward onto the outside of the housing 12. The light entry face 52 is aimed at the reflector face 40.

The reflector face 40 is formed by a mirror-coated and in particular metallized element, which is spaced apart from the transparent element 50 and disposed on a holder 42. The lighting means 30 is disposed on the underside of the gearbox and illuminates toward the reflector face 40 (downward, in the drawing). The lighting means 30 may for instance be an incandescent bulb or a light-emitting diode (LED, OLED). In the exemplary embodiment, the lighting means 30 is shown as an LED mounted on a circuit board (SMD-LED).

The transparent element 50 is disposed in the region of the power tool 10 that is located between the switch actuation element 20 and the gear 16 and adjoins the switch actuation element 20. The transparent element may be of plastic, such as PMMA (polymethylmethacrylate), PC (polycarbonate), PS (polystyrene), or the like.

Figure 3:
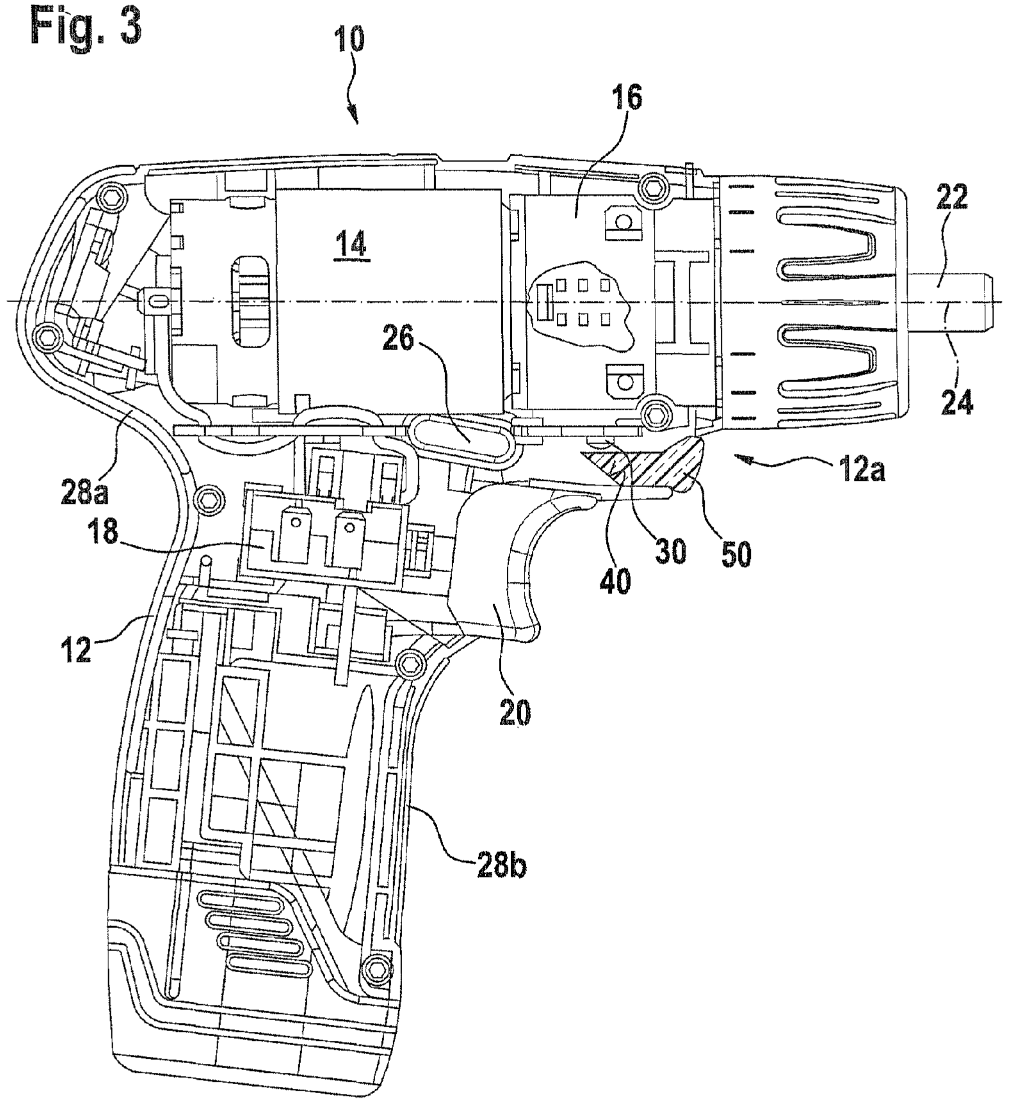
FIG. 3 shows a section through a first preferred embodiment of a preferred cordless electric power tool having a second preferred work field lighting system.
Figure 4:
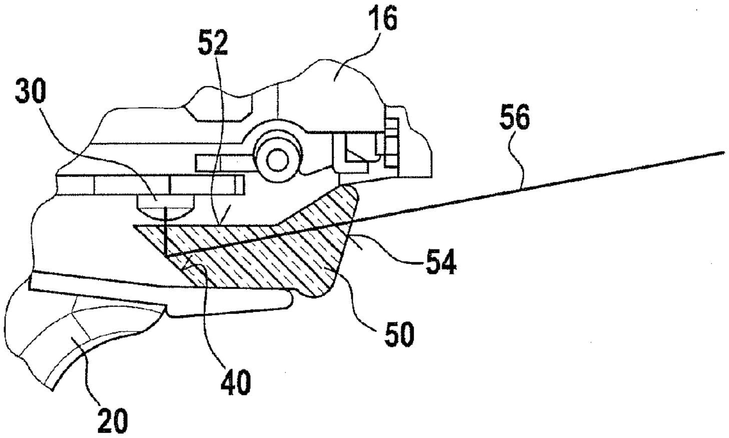
FIG. 4 shows a detail of the preferred work field lighting system in FIG. 3.

FIGS. 3 and 4 show a section through a power tool 10 in a second preferred embodiment. FIG. 4 illustrates a detail of the embodiment.

As in the first exemplary embodiment, the power tool 10, embodied for instance as a cordless electric power tool, having a housing identified overall by reference numeral 12 includes a motor 14 in a motor housing 28*a*, with a gear 16, which is connected in the direction of a tool holder axis 24 and is disposed in a gearbox not identified by reference numeral, and adjoining it, a tool holder 22 for a tool insert, not shown. A switch 26 for changing the direction of rotation is disposed underneath the motor 14 and adjacent to it. The tool insert can be driven in rotary and/or percussive fashion. Underneath the motor 14 is a switch 18 for switching the motor 14 on and off; it can be actuated by a user of the power tool 10 via a switch actuation element 20. A handle part 28*b*, in which a battery pack, not identified by reference numeral, is inserted in the lower region, is adjacent to and beneath the switch actuation element 20.

The power tool 10 has a work field lighting system, which is disposed in the housing 12 and forms a housing region 12*a*; the work field lighting system includes a lighting means 30 and a transparent element 50. From the transparent element 50, light from the lighting means 30 can be fed to the work field in front of the tool holder 22, and a beam of light 56 can be deflected between the lighting means 30 and the transparent element 50 at a reflector face 40. Propagation of the light between the lighting means 30 and the transparent element 50 can be effected by means of an air segment, in particular without an optical waveguide.

The transparent element 50 forms one region 12*a* of the housing 12; that is, it penetrates the housing shell and protrudes with its light entry face 52 into the interior of the housing 12 and with its light exit face 54 it protrudes outward onto the outside of the housing 12. In the exemplary embodiment, the lighting means 30 is shown as an LED mounted on a circuit board (SMD-LED).

The reflector face 40 here is a component of the transparent element 50 and is formed by a face which is inclined at an angle to the primary projection direction of the lighting means 30 that leads to the total reflection of the light in the direction of the light exit face 54. The light entry face 52 is aimed at the lighting means 30.

The transparent element 50 is disposed in the region of the power tool 10 that is located between the switch actuation element 20 and the gear 16 and adjoins the switch actuation element 20. The transparent element may be of plastic, such as PMMA (polymethylmethacrylate), PC (polycarbonate), PS (polystyrene), or the like.

Figure 5:
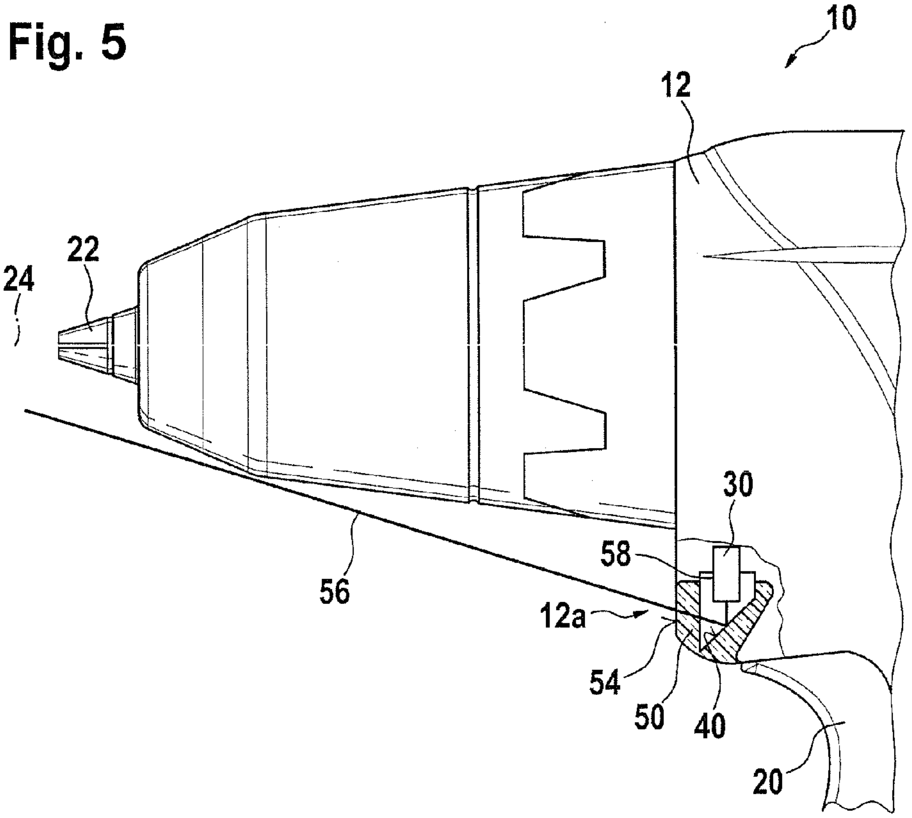
FIG. 5 shows a detail of a third preferred embodiment of a power tool of the invention.

FIG. 5 shows a further preferred embodiment of a power tool 10 with a work field lighting system. The power tool 10 corresponds in its structure to the power tools in FIGS. 1 and 3, to which reference is made for a more-detailed description.

A transparent element 50 forms a region 12*a* of a housing 12 of the power tool 10. In this exemplary embodiment, the transparent element 50 is embodied as a prism. The prism has a recess 58, into which a lighting means 30 is inserted. The lighting means 30 is disposed on an underside of a gearbox.

A beam of light 56 from the lighting means 30 is deflected at a reflector face 40 toward the light exit face 54 of the transparent element 50, in order to illuminate a work field in front of a tool holder 22 of the power tool 10. The reflector face is a mirror-coated prism" face, which is disposed at a suitable angle to the lighting means 30.

The foregoing relates to the preferred exemplary embodiments of the invention, it being understood that other variants and embodiments thereof are possible within the spirit and scope of the invention, the latter being defined by the appended claims.

The invention claimed is:

1. A power tool, comprising:

power tool housing;

a work field lighting system disposed in the power tool housing, the work field lighting system including a lighting arrangement, a transparent element, and a reflector face, wherein substantially all light from the lighting arrangement is directed to the work field in front of a tool holder of the power tool, wherein the transparent element includes a light entry face protruding into an interior of the power tool housing and a light exit face protruding outward onto an outside of the power tool housing, the light entry face being proximate the reflector face and spaced apart from the reflector face, and wherein a primary beam output from the lighting arrangement is substantially in a first direction toward the reflector face, such first direction is other than towards the work field and is then deflected by the reflector face and emitted from the light exit face of the transparent element in a second direction toward the work field.

2. The power tool as defined by claim 1, wherein propagation of the light between the lighting arrangement and the transparent element does not include an optical waveguide.

3. The power tool as defined by claim 1, wherein the lighting arrangement is spaced apart from the transparent element.

4. The power tool as defined by claim 1, wherein the lighting arrangement engages a recess in the transparent element.

5. The power tool as defined by claim 1, wherein the reflector face is metal-coated.

6. The power tool as defined by claim 1, wherein the transparent element adjoins a switch actuation element.

7. The power tool as defined by claim 1, wherein the lighting arrangement is activatable when the switch actuation element is pressed, before a motor can be switched on by the switch actuation element.

8. The power tool according to claim 1, wherein the lighting arrangement outputs the beam of light at a substantially right angle to a longitudinal axis of the tool holder.

9. The power tool as defined by claim 1, wherein the reflector face is flat.

10. The power tool as defined by claim 1, wherein the first direction is disposed relative to the second direction at an angle of less than 90 degrees.

11. A power tool, comprising:

power tool housing;

a work field lighting system disposed in the power tool housing the work field lighting system including a lighting arrangement, a transparent element, and a reflector face, wherein substantially all light from the lighting arrangement is directed to the work field in front of a tool holder of the power tool, wherein the transparent element forms one region of the housing of the power tool, and the reflector face is integral with the transparent element, and wherein a primary beam output from the lighting arrangement is substantially in a first direction toward the reflector face, such first direction is other than towards the work field and is then deflected by the reflector face and emitted from the light exit face of the transparent element in a second direction toward the work field.

12. The power tool according to claim 11, wherein the transparent element has a light entry face which is aimed at the lighting arrangement.

13. The power tool according to claim 11, wherein the reflector face is formed by a face of the transparent element which is inclined at an angle to the lighting arrangement that leads to total refection of the light.

14. The power tool according to claim 11, wherein the transparent element is a prism.

15. The power tool according to claim 11, wherein the lighting arrangement outputs the beam of light at a substantially right angle to a longitudinal axis of the tool holder.

16. The power tool as defined by claim 11, wherein the reflector face is flat.

17. The power tool as defined by claim 11, wherein the first direction is disposed relative to the second direction at an angle of less than 90 degrees.

18. The power tool as defined by claim 11, wherein the reflector face is formed in one piece with the transparent element.

19. The power tool as defined by claim 11, wherein the reflector face is in direct contact with the transparent element.

20. The power tool according to claim 11, wherein the transparent element has a light entry face which is aimed at the lighting arrangement, and wherein the reflector face is formed by a face of the transparent element which is inclined at an angle to the lighting arrangement that leads to total refection of the light.

21. The power tool according to claim 11, wherein the transparent element is a prism, wherein the lighting arrangement outputs the beam of light at a substantially right angle to a longitudinal axis of the tool holder, and wherein the reflector face is flat.

* * * * *